United States Patent
Cahen et al.

(10) Patent No.: US 12,305,536 B2
(45) Date of Patent: May 20, 2025

(54) BLADED TURBINE STATOR FOR A TURBINE ENGINE

(71) Applicant: SAFRAN AIRCRAFT ENGINES, Paris (FR)

(72) Inventors: Jean Cahen, Moissy-Cramayel (FR); Cyril Leo Benoit, Moissy-Cramayel (FR); Jean-Philippe Mallat-Desmortiers, Moissy-Cramayel (FR); Romain Noselli, Moissy-Cramayel (FR); Mireya Sanchez Gomez, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/000,065

(22) PCT Filed: May 26, 2021

(86) PCT No.: PCT/FR2021/050957
§ 371 (c)(1),
(2) Date: Nov. 28, 2022

(87) PCT Pub. No.: WO2021/245339
PCT Pub. Date: Dec. 9, 2021

(65) Prior Publication Data
US 2023/0203959 A1 Jun. 29, 2023

(30) Foreign Application Priority Data
Jun. 4, 2020 (FR) ...................... 2005835

(51) Int. Cl.
*F01D 9/04* (2006.01)
*F01D 25/00* (2006.01)
*F01D 5/28* (2006.01)

(52) U.S. Cl.
CPC ........... *F01D 9/041* (2013.01); *F01D 25/005* (2013.01); *F01D 5/28* (2013.01); *F05D 2220/32* (2013.01);
(Continued)

(58) Field of Classification Search
CPC .......... F01D 9/041; F01D 9/04; F01D 25/005; F01D 5/28; F01D 5/282; F01D 5/284; F01D 5/286; F01D 5/288
See application file for complete search history.

(56) References Cited

U.S. PATENT DOCUMENTS 3,650,635 A * 3/1972 Wachtell ................. B23P 6/005
29/402.13
5,740,674 A * 4/1998 Beutin .................... F01D 9/042
415/142
(Continued)

FOREIGN PATENT DOCUMENTS

| EP | 1227218 A2 | 7/2002 |
| EP | 2213840 A2 | 8/2010 |
(Continued)

OTHER PUBLICATIONS

International Search Report received for PCT Patent Application No. PCT/FR2021/050957, mailed on Aug. 12, 2021, 7 pages (3 pages of English Translation and 4 pages of Original Document).

Primary Examiner — Woody A Lee, Jr.
Assistant Examiner — Behnoush Haghighian
(74) Attorney, Agent, or Firm — WOMBLE BOND DICKINSON (US) LLP

(57) ABSTRACT

A turbine nozzle for a turbine engine, including two annular walls extending about the same axis, the walls being connected to each other by blades having an aerodynamic profile, the nozzle being divided into sectors and including several nozzle sectors arranged circumferentially end-to-end about a longitudinal axis. The blades include first blades (Continued)

made from a first metal alloy, and second blades made from a second metal alloy different from the first alloy, each nozzle sector including first blades and second blades. The invention also relates to a turbine engine, in particular of an aircraft, including at least one such nozzle. The invention also relates to a method for manufacturing such a nozzle in which each of the sectors is produced, for example, by additive manufacturing.

12 Claims, 3 Drawing Sheets

(52) U.S. Cl.
CPC ...... *F05D 2230/31* (2013.01); *F05D 2240/12* (2013.01); *F05D 2300/17* (2013.01)

(56) References Cited

U.S. PATENT DOCUMENTS

| | | | |
|---|---|---|---|
| 5,875,549 A * | 3/1999 | McKinley | C23C 14/0005 29/889 |
| 6,494,677 B1 | 12/2002 | Grady | |
| 7,404,700 B1 * | 7/2008 | Spanks, Jr. | F01D 5/282 416/241 A |
| 8,162,603 B2 * | 4/2012 | Schilling | F01D 5/28 415/209.4 |
| 8,950,069 B2 | 2/2015 | Ress, Jr. | |
| 9,845,692 B2 * | 12/2017 | Jamison | F01D 25/005 |
| 10,184,344 B2 * | 1/2019 | Roberts | F01D 9/042 |
| 10,337,404 B2 * | 7/2019 | McMahan | F01D 9/023 |
| 2010/0061863 A1 * | 3/2010 | Delvaux | B23K 26/0006 219/121.68 |
| 2010/0196147 A1 * | 8/2010 | Schilling | F01D 5/28 415/173.1 |
| 2011/0217159 A1 * | 9/2011 | McMahan | F01D 25/08 415/115 |
| 2014/0212284 A1 * | 7/2014 | Jamison | F01D 9/042 29/889 |
| 2016/0326896 A1 * | 11/2016 | Jamison | F01D 5/284 |
| 2017/0107836 A1 * | 4/2017 | Roberts | F01D 25/005 |
| 2018/0179898 A1 * | 6/2018 | Baumas | F01D 9/041 |

FOREIGN PATENT DOCUMENTS

| | | |
|---|---|---|
| EP | 2365198 A2 | 9/2011 |
| EP | 3091187 A1 | 11/2016 |

* cited by examiner

[Fig.1]
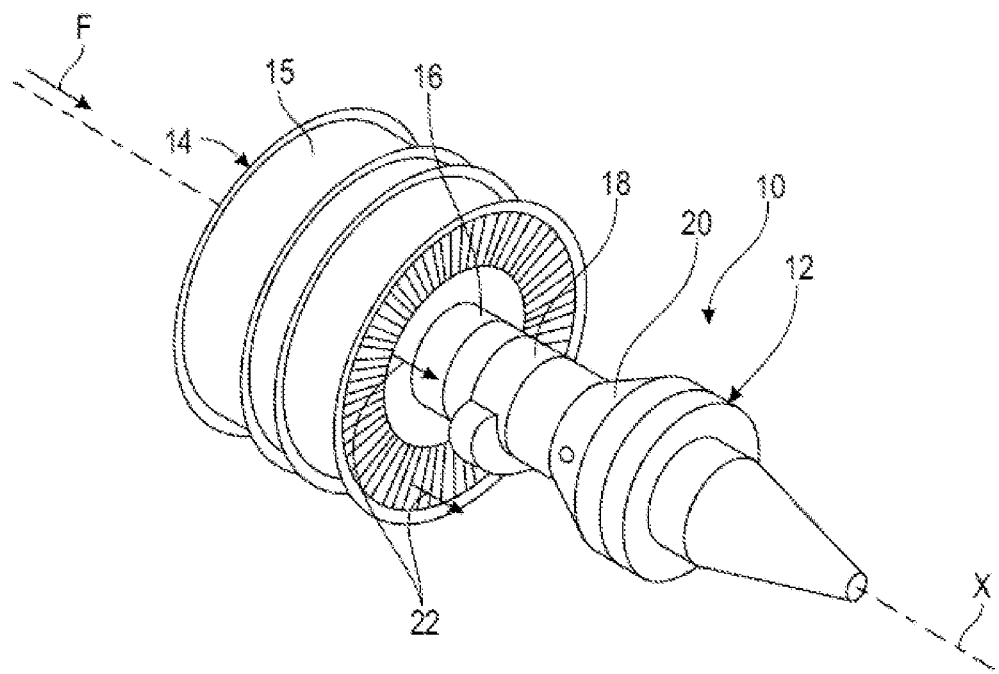

[Fig.2]
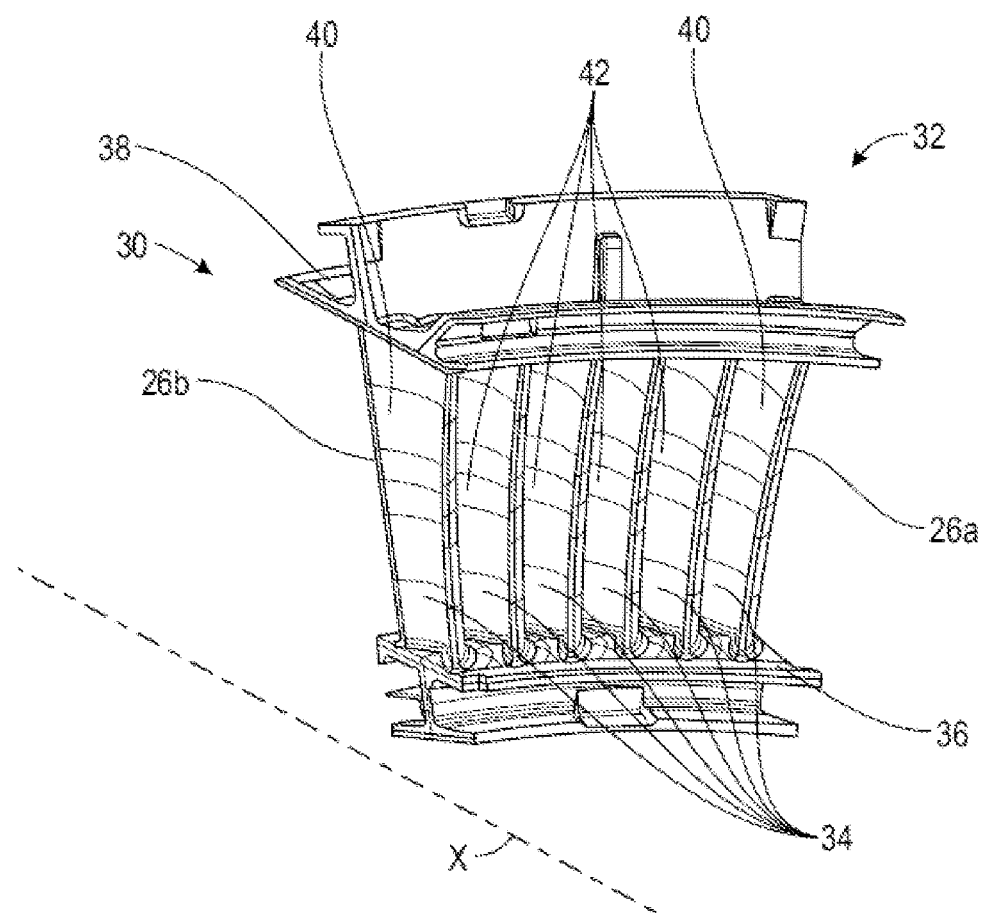

[Fig.3a-3b]
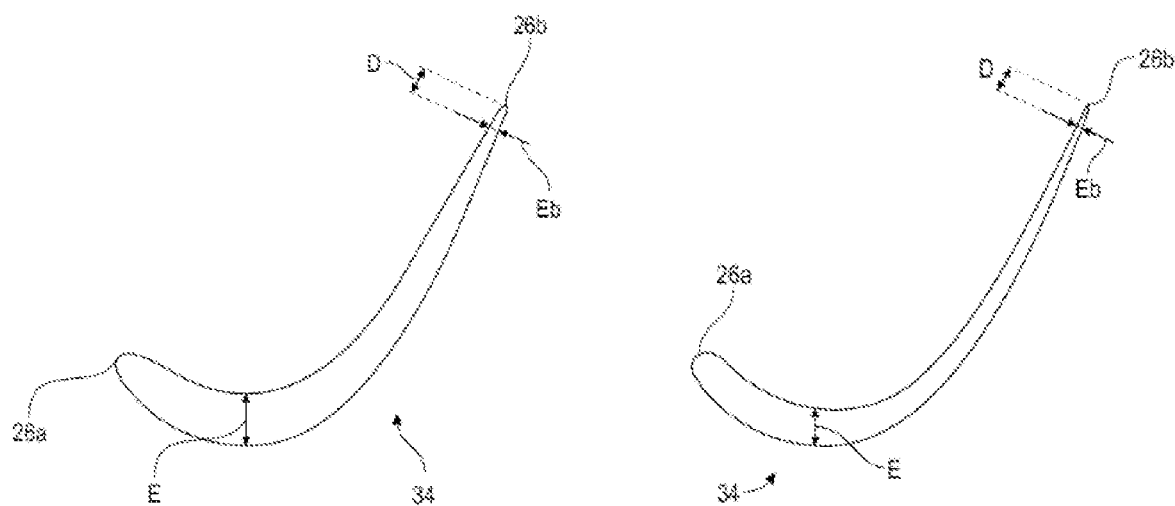

BLADED TURBINE STATOR FOR A TURBINE ENGINE

TECHNICAL SCOPE OF THE INVENTION

The present invention relates to a bladed turbine stator for an aircraft turbine engine.

TECHNICAL BACKGROUND

The prior art comprises, in particular, the document EP 1 227 218 A2.

A turbine engine, and in particular an aircraft turbine engine, comprises at least one annular duct along a longitudinal axis and in which an aerodynamic air flux circulates. This air flux passes from upstream to downstream and successively through a compressor assembly, a combustion chamber and a turbine assembly of the turbine engine. The terms "upstream" and "downstream" are defined with respect to the circulation of gas flow in the turbine engine. The compressor assembly comprises one or more compressor stages and the turbine assembly comprises one or more turbine stages. The compressor and turbine stages each comprise a plurality of annular rows of fixed blades and rows of rotating vanes. The fixed blades, known as bladed stator in a turbine or stator vanes in a compressor, direct the flux to the rotating vanes. The latter exchange the energy of the flux with a rotating shaft coaxial to the longitudinal axis. Each blade and each vane extends radially between a leading end and a trailing end and has an upstream leading edge and a downstream trailing edge. Between the leading and trailing edges there are opposing pressure side and suction side surfaces. The fixed blades extend between two annular walls of the bladed stator, inner and outer respectively.

Such a bladed turbine stator is divided into sectors and comprises a plurality of bladed stator sectors arranged circumferentially end to end about the longitudinal axis. A sector comprises several fixed blades.

The bladed stators in each stage consist of blades with an identical profile and made of a single metal alloy. It is understood here that all the fixed blades of a single stage have an identical profile and are made of a single metal alloy. The profile and alloy of all the blades of a single stage are intended to ensure a sufficient level of performance efficiency and mechanical strength to guard against failure. Thus, the choice of blade profile and metal alloy is a compromise between mechanical strength, temperature resistance, density, roughness, manufacturability and cost.

However, the study of stress maps shows that, although identical to each other, the blades of the same bladed stator, i.e., the blades of the same stage, are not subject to the same mechanical stresses, in particular due to the sectorisation of the bladed stator. The choice of a single material is therefore not optimised for at least some of the blades.

The invention aims to improve at least one of the above problems.

SUMMARY OF THE INVENTION

The invention proposes a bladed turbine stator for a turbine engine, comprising two annular walls extending about the same axis, the walls being connected to each other by blades having an aerodynamic profile, the bladed stator being divided into sectors and comprising several bladed stator sectors arranged circumferentially end to end about said axis.

According to the invention, the blades comprise first blades made of a first metal alloy, and second blades made of a second metal alloy different from the first alloy, each bladed stator sector comprising first blades and second blades.

The invention thus proposes to differentiate the materials of the first blades from those of the second blades so as to be able to take into consideration the different mechanical stresses exerted on the first and second blades respectively.

For example, for the blades subjected to a lower mechanical stress, a material can be chosen:
  with a lower density in order to reduce the weight of the turbine, and/or
  with a better roughness in order to reduce aerodynamic losses, and/or
  with a lower cost price.

It is also possible to choose a better material for the blades undergoing the most mechanical stress and to reduce the profile of all the blades in order to reduce the weight of the bladed stator and improve the overall aerodynamic performance of the bladed stator.

The bladed stator according to the invention may comprise one or more of the following features, taken alone with each other or in combination with each other:
  each bladed stator sector comprises first blades at the circumferential ends of that sector, and second blades between those first blades.
  each bladed stator sector comprises between three and six blades, of which only two first blades are located at the circumferential ends of that sector respectively.
  the first alloy has:
    a) a higher Re0.2 than the second alloy, and/or
    b) a lower Young's modulus than the second alloy, and/or
    c) a higher coefficient of expansion than the second alloy, and/or
    d) a higher elongation at break than the second alloy.
  the first and second alloys are of the equiaxed type.
  the first blades are made of René125 and the second blades are made of René77.
  the blades each have a leading edge and a trailing edge, the trailing edge of each of the blades having a thickness of less than 0.5 mm, and preferably less than or equal to 0.3 mm, and each of the blades having a maximum thickness of less than 3 mm, and preferably less than or equal to 2 mm.

The present invention also relates to a turbine engine, in particular an aircraft, comprising at least one bladed stator as described above.

The present invention also relates to a method of manufacturing a bladed stator as described above. According to the invention, each of the sectors is made by additive manufacturing.

BRIEF DESCRIPTION OF THE FIGURES

The invention will be better understood and other details, features and advantages of the invention will become clearer from the following description made by way of non-limiting example and with reference to the attached drawings in which:

FIG. 1 is a schematic perspective view of an aircraft turbine engine, seen from the downstream and from the side;

FIG. 2 is a schematic perspective view of a bladed stator according to the invention; and FIGS. 3a and 3b are schematic views of conventional (FIG. 3a) and optimised (FIG. 3b) blade profiles.

DETAILED DESCRIPTION OF THE INVENTION

FIG. 1 schematically shows an aircraft turbine engine 10 which conventionally comprises a gas generator 12, a shaft of which drives a fan 14 which is here surrounded by a casing 15. The gas generator 12 comprises at least one compressor 16, a combustion chamber 18 and at least one turbine 20.

In the case of a dual-flow turbine engine, a flux F enters the fan 14 and is then divided into a primary flux (not visible in the figure), which enters the gas generator 12, and a secondary flux 22, which flows around the gas generator. The primary flux passes in particular, through the compressor 16 and the turbine 18.

The turbine 20, for example low-pressure turbine 20, comprises one or more turbine stages. The turbine stages each comprise a plurality of annular rows of fixed blades (referenced 34 in FIGS. 2 and 3) having an aerodynamic profile and rows of rotating blades (not shown). The blades extend radially across the turbine 20 where the primary flow flows. The fixed blades are configured to direct the primary flow towards the rotating blades. The term "radial" is defined with respect to an axis substantially perpendicular to a longitudinal axis X of the turbine engine.

As seen in FIG. 2, each stage of the turbine comprises a divided into sectors bladed stator 30, i.e., a bladed stator 30 having a plurality of bladed stator sectors 32 arranged circumferentially end-to-end about the longitudinal axis X. Each sector 32 comprises a plurality of said fixed blades 34.

The bladed stator 30 further comprises two annular walls 36, 38 in the form of platforms, respectively radially inner 36 and radially outer 38. The walls 36, 38 are in particular connected to each other by the fixed blades 34.

Each blade 34 comprises in particular an extrados wall and an intrados wall extending axially, i.e., along the longitudinal axis X. The top and bottom walls are connected to each other upstream by a leading edge 26a and downstream by a trailing edge 26b. In general, the terms "upstream" and "downstream" are defined in relation to the flow F, parallel to the longitudinal axis X, in the turbine engine 10, as shown in FIG. 1.

In the prior art, all the blades 34 of the same bladed stator are identical, i.e., the profiles and metal alloys are the same for all the blades 34 of the same turbine stage. Nevertheless, the study of the stress maps on the blades 34 shows that not all the blades 34 are subjected to the same mechanical stresses during the operation of the turbine engine, although they are identical to each other.

This study of the stresses enables to differentiate between two categories of blades 34 in each bladed stator sector 32 according to the mechanical stresses that they are subjected to during the operation of the turbine engine. More precisely, each sector comprises first blades 40 and second blades 42 which are subject to different mechanical stresses. The first blades 40 are positioned, for example, at the circumferential ends of the sector 32, and the second blades 42 are notably located between these first blades 40. Each bladed stator sector 32 comprises, for example, two first blades 40 and between one and six second blades 42 and here four second blades 42. The second blades 42 are subject to a lower level of stress than the first blades 40. The first blades 40, for example, work in tension whereas the second blades 42 work in particular in compression.

The invention proposes to make the first blades 40 and the second blades 42 of a different metal alloy, respectively a first and a second alloy, so as to optimise the materials of the individual blades 34. The bladed stator sector 32 of the invention is thus a multi-material sector. The first and second alloys are for example of the equiaxed type.

Thanks to the invention, it is thus possible to choose different first and second metal alloys for the first and second blades 40, 42 according to their respective need for mechanical strength so as to optimise the mass and aerodynamic performance of the bladed stator as well as to improve the general and local mechanical status of the bladed stator.

The fact that the second blades 42 are subjected to a lower level of stress provides a margin in the mechanical strength of the material to be selected. This mechanical margin can be used for different types of optimisations to improve the performance of the motor.

In particular, according to a first embodiment of the invention, the second alloy used for the second blades 42 undergoing less mechanical stress is optimised and the profile of the blades 34 is not necessarily modified.

Thus, for example, a second metal alloy is chosen for the second blades 42:
with a lower density in order to reduce the weight of the bladed stator and therefore of the turbine,
with a better roughness in order to reduce aerodynamic losses, and/or,
with a lower cost.

The first alloy of the first blades 40 then has the following characteristics in particular:
a yield strength at 0.2%, Re0.2, greater than that of the second alloy, and/or
a Young's modulus lower than that of the second alloy, and/or
a coefficient of expansion greater than that of the second alloy, and/or
an elongation at break greater than that of the second alloy.

In this example, the first blades 40 are for example made of René125 material, a material which ensures in particular a better resistance to low cycle fatigue and creep. The second blades 42 are for example made of a René77 material, a less expensive and less dense material, allowing an economic gain and a gain in mass.

The optimisation is mainly driven by the 0.2% yield strength, Re0.2. For example, between 600° C. and 1000° C., the delta between René125 and René77 results in a strength delta of more than 150 MPa, which can represent an increase of about 30% in strength depending on the temperature.

The optimization is also density driven, as the difference in density between René125 and René77 is about +7.5%.

A second embodiment of the invention, which may be combined with the first embodiment or carried out independently of the first embodiment, consists of an optimisation of the first alloy of the first blades 40 allowing to obtain a mechanical margin on all the blades 34 and thus to optimise their profile. As a result, the blades 34 will be less massive and more efficient from an aerodynamic point of view.

In order to withstand the mechanical stresses, despite the reduction in the profile of the blades 34, the first blades 40, identified as highly loaded, are thus optimised by a first, more efficient alloy. The second blades 42, identified as low stress, retain their original material or a material with intermediate mechanical strength characteristics.

The profiles of the blades 34, as shown in FIGS. 3a and 3b, allow for the different thicknesses of a blade 34 with a conventional profile (FIG. 3a) and a blade 34 with an optimised profile (FIG. 3b), i.e., thinner. The optimised profile blades have the same twofold objective as the conventional profile blades, namely, to ensure a sufficient level of aerodynamic performance and to have a mechanical strength that prevents any failure.

A blade 34 has a maximum thickness E. Each of the blades 34 of conventional profile has, for example, a maximum thickness E of less than 3 mm. This maximum thickness E can be reduced to 2mm in particular on a blade 34 with an optimised profile thanks to the invention and in particular to the choice of a better performing material for the first blades 40.

Furthermore, at a predetermined distance D, for example 1 mm, from the trailing edge 26b of the blade 34, the thickness Eb of a blade 34 can be measured at its trailing edge 26b. The trailing edge 26b of each of the conventional profile blades 34 has, for example, a thickness Eb of less than 0.5 mm. This trailing edge thickness Eb can be reduced to 0.3 mm in particular on a blade 34 with an optimised profile thanks to the invention and in particular to the choice of a better performing material for the first blades 40.

The optimisation of the profile of a blade 34 of a bladed stator 30 of a low-pressure turbine allows, for example, a non-negligible gain in mass of the order of 30% per blade 34.

In addition, the optimisation of the profiles of the blades 34 of bladed stator 30 of a low-pressure turbine, in particular by reducing the fineness of the trailing edge 26b, allows a gain in engine performance, in particular of the order of 0.01 efficiency points per bladed stator.

Each bladed stator sector 32 is for example manufactured according to the invention by additive manufacturing. This type of manufacture allows freedom of choice of material for each zone of the sector, provided that the materials are compatible with each other.

Alternatively, each sector could be manufactured by other manufacturing processes and in particular by a method of metal casting.

The present invention may be applied to a turbine engine 10, in particular an aircraft, comprising at least one bladed stator 30.

The invention claimed is:

1. A bladed turbine stator for a turbine engine, comprising two annular walls extending about a same axis, the walls being connected to each other by blades having an aerodynamic profile, the bladed turbine stator being divided into sectors and comprising several bladed stator sectors arranged circumferentially end to end about said axis, wherein the blades comprise first blades made of a first metal alloy, and second blades made of a second metal alloy different from the first alloy, each bladed stator sector comprising first blades and second blades, wherein the sectors are unitary one-piece elements separate from each other, wherein each bladed stator sector comprises first blades at the circumferential ends of that sector, and second blades between those first blades and wherein the first alloy has:

a higher yield strength at 0.2% than the second alloy, or
a lower Young's modulus than the second alloy, or
a higher coefficient of expansion than the second alloy, or
a higher elongation at break than the second alloy.

2. The bladed stator according to claim 1, wherein each bladed stator sector comprises between three and six blades, of which only two first blades are located at the circumferential ends of that sector respectively.

3. The bladed stator according to claim 1, wherein the first and second alloys are of the equiaxed type.

4. The bladed stator according to claim 1, wherein the first blades are made of a nickel based super alloy and the second blades are made of a nickel-cobalt vacuum super alloy.

5. The bladed stator according to claim 1, wherein the blades each have a leading edge and a trailing edge, each of the blades having, at a predetermined distance from the trailing edge, a thickness of less than 0.5 mm,, and each of the blades having a maximum thickness of less than 3 mm.

6. A turbine engine, in particular aircraft, comprising at least one bladed stator according to claim 1.

7. A method of manufacturing a bladed stator according to claim 1, wherein each of the sectors is produced by additive manufacturing.

8. The bladed stator according to claim 5, wherein the predetermined distance from the trailing edge is 1 mm.

9. The bladed stator according to claim 5, wherein the maximum thickness of each of the blades is less than or equal to 0.3 mm.

10. The bladed stator according to claim 7, wherein the maximum thickness of each of the blades is less than or equal to 2 mm.

11. The bladed stator according to claim 1, wherein each bladed stator sector comprises first blades at the circumferential ends of that sector, and second blades between those first blades and wherein the first blades are made of a nickel based super alloy and the second blades are made of a nickel-cobalt vacuum super alloy.

12. The bladed stator according to claim 1, wherein the first blades are made of a first nickel based super alloy and the second blades are made of a second nickel based super alloy.

* * * * *